United States Patent [19]
Freeman

[11] Patent Number: 5,841,741
[45] Date of Patent: Nov. 24, 1998

[54] AUTOMATIC SEAMLESS BRANCHING STORY-TELLING APPARATUS

[76] Inventor: Michael J. Freeman, 1270 Avenue of the Americas, Suite 2401, New York, N.Y. 10020

[21] Appl. No.: 843,262

[22] Filed: Apr. 14, 1997

[51] Int. Cl.⁶ .................................................. G11B 17/22
[52] U.S. Cl. .............................................. 369/33; 360/12
[58] Field of Search .................................. 369/33, 20, 22, 369/19, 31, 64, 32, 63, 65; 300/5, 6, 12; 434/319, 321, 320

[56] References Cited

U.S. PATENT DOCUMENTS

| | | |
|---|---|---|
| 3,735,503 | 5/1973 | Dow et al. . |
| 3,947,972 | 4/1976 | Freeman . |
| 4,078,316 | 3/1978 | Freeman . |
| 4,117,605 | 10/1978 | Kurland et al. . |
| 4,170,832 | 10/1979 | Zimmerman . |
| 4,264,924 | 4/1981 | Freeman . |
| 4,264,925 | 4/1981 | Freeman et al. . |
| 4,389,681 | 6/1983 | Tanaka et al. ............................. 360/27 |
| 4,420,656 | 12/1983 | Freeman . |
| 4,445,187 | 4/1984 | Best . |
| 4,571,640 | 2/1986 | Baer . |
| 4,573,072 | 2/1986 | Freeman . |
| 4,591,248 | 5/1986 | Freeman . |
| 4,749,354 | 6/1988 | Kerman .................................. 434/321 |
| 4,753,597 | 6/1988 | Pash et al. . |
| 4,777,537 | 10/1988 | Ueno et al. .............................. 358/341 |
| 4,847,699 | 7/1989 | Freeman . |
| 5,166,804 | 11/1992 | Takahashi ............................... 358/341 |
| 5,213,510 | 5/1993 | Freeman . |
| 5,340,317 | 8/1994 | Freeman . |

OTHER PUBLICATIONS

Usami, Shozo, "Parallel Random Access System: A New Method to Improve Foreign Language Training", Educational Technology, Feb. 1979, pp. 33–35.

Primary Examiner—Tan Dinh
Attorney, Agent, or Firm—David M. Klein; Shearman & Sterling

[57] ABSTRACT

An automatic story-telling apparatus includes a storage media having temporally parallel data storage tracks containing story content. The story content is stored on each of the temporally parallel tracks in successive information segments. The information is stored on the tracks in a predetermined timed sequence for providing story content varying dependent upon the temporally parallel tracks that are automatically selected during playback. A controller reads random switching control code information from the media and randomly switches between the tracks of the storage media for enabling automatic random playback of the story content. The command codes may also include memory storage commands and memory switching commands so as to maintain continuity of story characters, plot-lines, etc., once they are randomly chosen.

15 Claims, 2 Drawing Sheets

AUTOMATIC SEAMLESS BRANCHING STORY-TELLING APPARATUS

BACKGROUND OF THE INVENTION

1. Field of the Invention

The present invention relates generally to a story-telling apparatus, and more particularly to a story-telling apparatus that utilizes pre-recorded multi-track media to store stories, and that randomly and seamlessly transitions between the tracks of the media at predetermnined points in the story so as to randomly change the story being told in order to provide maximum entertainment and educational benefit.

2. Description of the Prior Art

Telling stories is a timeless method of entertaining and educating children, and for challenging their imaginations. The most common story-telling method is book reading. For younger children, reading requires the involvement of the child's parent, which is often inconvenient for the parent. Moreover, stories in books are stagnant, i.e., the story characters, plot lines, and ending do not change.

Using modem multi-media techniques and computers, stories can now be migrated to CD-ROM's and the like. Such multi-media stories permit music and sounds to make stories more realistic and, in some instances, enable the characters to become interactive. Multi-media techniques even permit the child to interact with and alter the outcome of the story. Typically, a computer must be used to play such multi-media stories, involving great cost and requiring the ability to read in order to operate the computer equipment. Beside the cost of the computer, such stories may only be played by the child at the computer location, which is generally not removable from this location (i.e., non-portable). Also, interactive multi-media stories may not be played by children too young to safely operate the computer. computer, such stories may only be played by the child at the computer location, which is generally not removable from this location (i.e., non-portable). Also, interactive multi-media stories may not be played by children too young to safely operate the computer.

Accordingly, a need exists for a relatively inexpensive portable automatic apparatus that is capable of telling stories to children and that includes the ability to seamlessly and randomly vary the story so as to maintain the interest of the child and to enhance the entertainment and educational value of the story. Stories that can seamlessly change and automatically alter themselves will garner greater motivation to listen by a child, challenge their imaginations more, and be more educational.

Systems that engage in interactive conversation using a multi-track media are well known in the art. For example, commonly owned U.S. Pat. Nos. 3,947,972 and 4,078,316, the contents of each of which are incorporated herein by reference, disclose a conversational teaching apparatus which employs a time synchronized multi-track audio tape to store educational conversation messages. This device employs one or more tracks to relay interrogatories to a user. The tracks are then used, selectable by a manual switching mechanism, to convey responsive messages.

Commonly owned U.S. Pat. Nos. 5,313,510 and 5,340,317, the contents of each of which are incorporated herein by reference, improved upon the earlier conversational system by programming conversations on a magnetic media in a decision-tree logic which allowed complex conversations to be developed using the multi-track media. The information is stored on each track in a plurality of reproducible information segments which contain interrogatory messages and associated multiple choice responses, responsive messages, informational messages, and combinations thereof. The responsive messages contained on the tracks are related in real-time and content to particular interrogatory messages on the tracks, and correspond with multiple choice selectable responses. The apparatus could exhibit pseudomemory and multiple simultaneous pseudo-memories; exhibit profiling and substitutability; and categorize and subcategorize users of the apparatus.

Commonly owned U.S. patent application Ser. No. 08/749,345, the contents of which are incorporated herein by reference, further improved the use of interactive multi-track media by utilizing voice recognition to recognize answers to interrogatories to provide switching between tracks of the media.

These existing systems are all interactive, i.e., they require user input to create the transition between tracks of the multi-track media. Accordingly, these systems do not meet the aforementioned need for a relatively inexpensive dedicated apparatus that is capable of telling stories to children and that includes the ability to seamlessly, randomly and automatically, without input from the child, vary the story so as to maintain the interest of the child and to enhance the entertainment and educational value of the story-telling apparatus.

SUMMARY OF THE INVENTION

The present invention is a story-telling apparatus which includes a storage media having a plurality of temporally related data storage tracks containing story content. The story content is stored on each track in a plurality of information segments. Each of the segments includes a complete message reproducible in response to the selection of the track upon which the segments are stored. Each of the information segments at any given time includes information related in real-time and content to information contained in each information segment on each track in an immediate prior time. The information is stored on the tracks in a predetermined timed sequence for providing story content varying dependent upon the tracks automatically selected during playback. The storage media also includes control code information.

Playback means facilitates playback of the story content of a selected data storage track. Track selector means, which is preferably a microprocessor and switch, reads the control code information and randomly selects and accesses one of the tracks of the storage media in response to the stored control code information for retrieving the information stored on the selected track and for enabling the playback of the retrieved information via the playback means.

In one embodiment, one of the data storage tracks includes the command codes. In this embodiment, the apparatus includes command code playback means for providing playback of the track having the command codes independently of the tracks having the story content. The temporally related data storage tracks are preferably stored on a magnetic storage media having a plurality of coextensive tracks and the playback means includes magnetic storage media reading means corresponding with each of the plurality of coextensive tracks. Alternatively, the playback means includes magnetic storage media reading means for the command code track, and at least one magnetic media storage media reading means for the coextensive tracks having the story content.

If desired, the tracks may be stored digitally and be randomly accessible. In this embodiment, the storage media is selected from the group consisting of magnetic disk, compact disk, video disk, magnetic tape, RAM, PROM, EPROM, and EEPROM. In a preferred embodiment, the data storage media are analog cassette tapes and the playback means enables the removal and replacement of the storage media.

The command codes may further include memory storage commands and memory switching commands. After the microprocessor randomly selects a current track, it stores a first identification of the track being played in memory. It holds this track in memory via a memory storage command. Then, in response to a memory switching command, it switches back to the track originally associated with the first identification. By using this method a number of times in one story, certain elements, after being chosen randomly, are repeated in the story to maintain consistency. So if the story randomly begins about a little girl named Casey, for example, this information will remain constant throughout the story. If desired, the tracks that include story content may include audible or inaudible control commands for the track selector means. The microprocessor or other controller discriminates the audible or inaudible control commands from the story content.

In addition, a memory stores the branching of playback of the entire story. When the story is next played back, the memory can be used to play back the story using the stored branching, instead of randomly. A store or repeat switch initiates this memory and the playing back of the stored branching. If desired, a code is used for identifying each particular story or storage media in order to enable the storing and playback of branching of each particular story or storage media from memory.

DESCRIPTION OF THE PREFERRED EMBODIMENT

Figure 1:
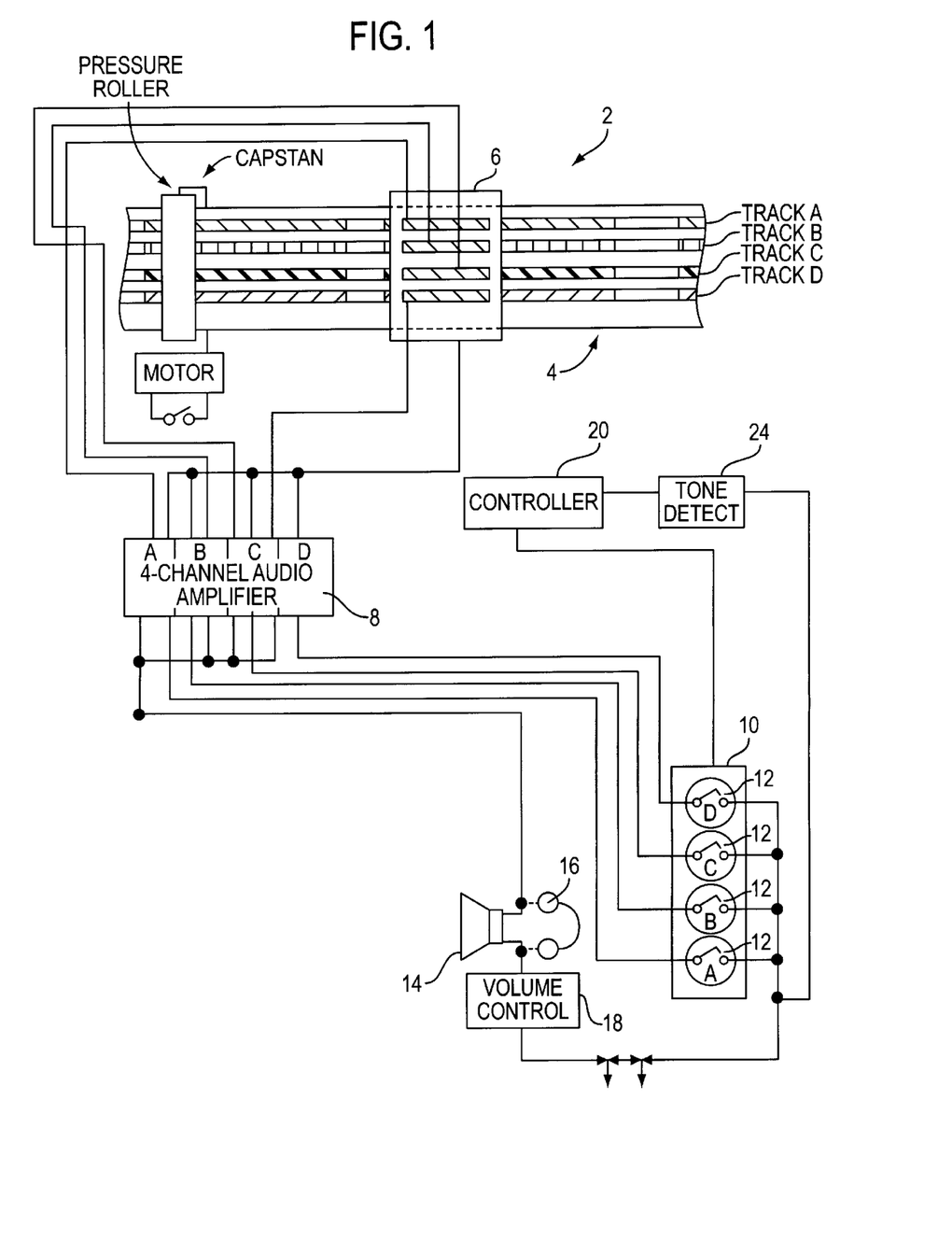
FIG. 1 is a diagrammatic illustration, partially in schematic, of the selection, playback, and controller portions of one embodiment of the present invention.

Referring now to the drawings in detail, and initially to FIG. 1, the automatic seamless branching story-telling apparatus of the present invention uses a playback mechanism similar to those disclosed in commonly owned U.S. Pat. Nos. 3,947,972; 5,313,510; and 5,340,317, and in commonly owned co-pending U.S. patent application Ser. No. 08/49,345, the contents of each of which are incorporated herein by reference. A conventional multi-track magnetic tape player 2 is utilized for retrieving audio information from a multi-track magnetic storage media 4 via multi-track playback head 6. The playback head 6 is preferably connected in conventional fashion to a conventional four channel audio amplifier 8, having one channel for each of the respective four tracks, A, B, C, D of multi-track tape 4 so as to conventionally play back the information stored on the respective audio tracks. Playback head 6 is preferably a conventional 4 channel audio playback head, with preferably equal head widths for each of the respective tracks A, B, C, D.

The output of audio amplifier 8 is preferably connected to a switch 10 which preferably incorporates a plurality of switches 12, with one switch being provided per track of multi-track tape 4. Each switch 12 is connected to the appropriate channel output of audio amplifier 8. Switches 12 are preferably conventional magnetic or electronic switches that are switched as desired by switch 10. Switches 12 are preferably connected between the output of audio amplifier 8 and a conventional audio output device, such as a speaker 14 or earphones 16, through a volume control 18. The other terminal of audio output device 14 or 16 is connected to audio amplifier 8 to complete the circuit. Thus, when one of switches 12 is closed, the output of the corresponding audio track A, B, C or D, all of which are being provided to audio amplifier 8 by multi-track playback head 6, is selectively provided to audio output device 14 or 16 to be heard by a child or other user.

Switch 10 is preferably a relatively simple logic circuit for receiving the output of controller 20, and for switching to one of the audio tracks on the basis of the signal from controller 20. For example, controller 20 may utilize a two-bit output which is received by switch 10 and by which switch 10 selects from amongst the 4 channels.

As described in greater detail below, the audio tracks include messages having audible or inaudible control tones that define switching locations within the content of the messages. These tones are detected by a tone detector (decoder) 24 which generates an output signal to controller 20 when a control tone is detected. Controller 20 receives the output of tone detector 20 and randomly selects one of the four channels for switching to that channel. Controller 20 then generates commands to switch 10 to select the randomly selected one of the four channels for playback.

The multi-track tape 4 is preferably removable from the playback means 2 so that different multi-track tapes 4 having different stories stored thereon may be inserted and used in the apparatus of the invention. This makes it possible to record a library of prerecorded media covering a wide array of topics. For example, as described below, the media might contain stories regarding one type or theme, and other media containing other types or themes of stories. The removable media are preferably multi-track magnetic tape cartridges, but may be any removable multi-track media such as, for example, magnetic disk, optical disk, or other media appropriate for the present application. These removable multi-track tapes are preferably contained in rigid cartridges for convenient removal and replacement.

The apparatus of the present invention may comprise other embodiments. Rather than utilizing a multi-track magnetic tape or other removable media, the system might use any appropriate data storage means for containing various stories, provided that the information stored thereon may be separated into tracks. For example, a conventional magnetic disk, CD or other optical disk, or even hardware, such as RAM, PROM, ROM or EPROM, could be used to store the information. The information data could be physically stored on individual disk tracks, or the data could be organized so that each track of information is randomly accessible as separate or separable files on the disk or storage media. In conjunction with a disk reader appropriate for the type of disk drive in use, or a microprocessor or microcontroller for reading the digital data from a hardware memory device, the information stored on the individual tracks could be output to a user of the system in a real-time or near real-time fashion.

When utilizing a disk or other physical media for storing digital data, it might be advantageous for a microprocessor to be provided for the purpose of first reading the various tracks into a memory cache, which would allow faster access to the story information. Thus, during operation in this instance, the microprocessor would read the serial track information from the disk into parallel tracks in cache memory in advance, while substantially simultaneously reading the track data from cache to memory to an output device. As the cache memory were depleted, it would be refilled from disk or other media by the processor. The microprocessor could be used in this instance also to provide switching functions.

Output to the user could be by various devices, depending on the type of media used. For example, if the stored stories on the multi-track media are in digital form, i.e. CD-ROM, magnetic disk, DAT, the processor or other means could convert the digital information streams to analog signals for output to conventional headphones or could be output directly to digital headphones. It is anticipated that the system of the present invention could employ a large variety of multi-media inputs and outputs as such technologies develop. It is further anticipated that any storage means capable of storing and substantially simultaneously retrieving story data could be employed by the present invention. Whatever multi-track device is employed, it should preferably contain one track for each of the number of tracks to be used in the story. In a preferred embodiment, four equal bandwidth tracks are used. It may, however, be advantageous to utilize a larger number of tracks to obtain more complex stories, or a smaller number if cost is a factor.

If desired, the four channel audio amplifier could be replaced by a conventional one channel amplifier which amplifies only the one selected channel. As discussed below, if one channel is to be reserved for control commands, a conventional one channel amplifier could be used to read the control commands, while another conventional one channel amplifier could be used to select from amongst the remaining channels for the story.

The information is stored on each track in a plurality of reproducible information segments, each of which comprises a story message reproducible by the playback device directly in response to the automatic selection of the track upon which the segments are stored. Each of the information segments on the various tracks contain messages, music, sound effects, etc. The messages contained on the various tracks are related in real-time to the time-synchronized messages on the other tracks so that a story may be told as the media is played back. As the controller automatically randomly switches between the tracks at the switch points denoted by the tones on the tape, which may occur between paragraphs, sentences, and mid-sentence, random storytelling outcomes are routed to the output device. By perfectly synchronizing the channels, such switching may occur completely seamlessly. On the randomly selected track at the time at which the switch occurred, is an information segment whose content corresponds with the information on the prior track on the prior channel, but may be different from the information on the other tracks at the current time. The various story messages, may generally be contained on any or all of the various tracks provided that they are synchronized properly so as to retain a timed relationship.

In order to understand the story-telling system of the invention, several examples will now be provided. Example 1 illustrates a relatively simple story. In this example, all four channels of the media are used to store the stories. Audible or inaudible tones are present on the channels in the positions labeled "BRANCH CODE." If the tones are audible, they may be embedded within the background music or sound effects. The tones are preferably of a sufficiently high or low frequency and/or a specified duration so as to effectively be inaudible and not interfere with the story content. The command codes may be either analog or digital signals. These tones are detected by tone detector 24, which causes controller 20, which is preferably a microprocessor, to randomly switch to one of the channels. If the current channel is the randomly selected channel, no switch will occur. Controller 20 generates a binary output corresponding to the desired channel. Switch 10 receives the binary signal from controller 20 and selects a channel from channels 1, 2, 3 and 4 corresponding to binary outputs 00–11. As shown in the example, in addition to random switches, non-random switching may occur as well. Controller 20 is equipped with any appropriate type of memory for performing memory-type functions. In Example 1, "Branch Type X" denotes a command to the microprocessor to place in the indicated memory the Channel No. (e.g. X-1 stores the Channel No. in memory #1) of the channel being played at the time of the branch. Branch Type "Y" is a random branch to any of the four channels. Branch type "Z" is a branch to the Channel indicated in the associated memory (e.g., Branch Type Z-1 will branch to the Channel No. stored in memory No. 1.)

EXAMPLE 1

| Channel 1 | Channel 2 | Channel 3 | Channel 4 | SWITCH COMMANDS |
|---|---|---|---|---|
| (music up and under) | (music up and under) | (music up and under) | (music up and under) | inaudible tones or digital commands embedded in audio on Channels 1–4 at [BRANCH CODE ]points |
| Once upon a time a little girl named Rebecca was taking a walk behind her house. | Once upon a time a little girl named Rebecca was taking a walk behind her house. | Once upon a time a little girl named Rebecca was taking a walk behind her house. | Once upon a time a little girl named Rebecca was taking a walk behind her house. | |
| [BRANCH CODE] Rebecca was 6 years old | [BRANCH CODE] Rebecca was 7 years old | [BRANCH CODE] Rebecca was 8 years old | [BRANCH CODE] Rebecca was 9 years old | Branch Type Y |
| [BRANCH CODE] and was wearing a yellow dress. She walked and walked and suddenly realized that she was lost in the woods behind | [BRANCH CODE] and was wearing a pink dress. She walked and walked and suddenly realized that she was lost in the woods behind | [BRANCH CODE] and was wearing a polka dot dress She walked and walked and suddenly realized that she was lost in the woods behind | [BRANCH CODE] and was wearing a white dress. She walked and walked and suddenly realized that she was lost in the woods behind | Branch Type X-1 |

-continued

| Channel 1 | Channel 2 | Channel 3 | Channel 4 | SWITCH COMMANDS |
|---|---|---|---|---|
| her home. These were very large woods and her [BRANCH CODE] mother told her never to go in there. She walked and walked and became more and more lost. | her home. These were very large woods and her [BRANCH CODE] father told her never to go in there. She walked and walked and became more and more lost. | her home. These were very large woods and her [BRANCH CODE] father told her never to go in there. She walked and walked and became more and more lost. | her home. These were very large woods and her [BRANCH CODE] older brother told her never to go in there. She walked and walked and became more and more lost. | Branch Type Y |
| Rebecca jumped when she heard a large thunder clap (thunder sound effect). She looked up and saw dark clouds. Rebecca knew it was going to storm soon. She had to get back home soon (sound effect-more thunder). | Rebecca jumped when she heard a large thunder clap (thunder sound effect). She looked up and saw dark clouds. Rebecca knew it was going to storm soon. She had to get back home soon (sound effect-more thunder). | Rebecca jumped when she heard a large thunder clap (thunder sound effect). She looked up and saw dark clouds. Rebecca knew it was going to storm soon. She had to get back home soon(sound effect-more thunder). | Rebecca jumped when she heard a large thunder clap (thunder sound effect). She looked up and saw dark clouds. Rebecca knew it was going to storm soon. She had to get back home soon (sound effect-more thunder). | |
| [BRANCH CODE] Suddenly, she saw a cute little squirrel. | [BRANCH CODE] Suddenly, she saw a cute little rabbit. | [BRANCH CODE] Suddenly, she saw a cute little white rabbit. Can you | [BRANCH CODE] Suddenly, she saw a cute little owl. | Branch Type X-2 |
| Can you help me get home Rebecca asked the squirrel? "Sure can"said the squirrel(sound effect of thunder and rain). Just then it began to rain and storm. | Can you help me get home Rebecca asked the rabbit? "Sure can"said the rabbit(sound effect of thunder and rain). Just then it began to rain and storm. | help me get home Rebecca asked the white rabbit? "Sure can"said the white rabbit(sound effect of thunder and rain). Just then it began to rain and storm. | Can you help me get home Rebecca asked the owl? "Sure can"said the owl(sound effect of thunder and rain). Just then it began to rain and storm. | |
| [BRANCH CODE] The squirrel began to run for a tree but yelled back, "go on straight until you come to a big oak tree near a [BRANCH CODE] waterfall. | [BRANCH CODE] The rabbit began to run for a hole but yelled, "go on straight until you come to a big oak tree near a [BRANCH CODE] babbling brook | [BRANCH CODE] The white rabbit began to run under a log but yelled back, "go on straight until you come to a big oak tree near a [BRANCH CODE] stream. | [BRANCH CODE] The owl began to fly away but yelled back, "go on straight until you come to a big oak tree near a [BRANCH CODE] broken fence. | Branch Type Z-2

Branch Type X-3 |
| Turn left and that's the way out of the woods and back to your home."(sound effects rain and wind) | Turn left and that's the way out of the woods and back to your home."(sound effects rain and wind) | Turn left and that's the way out of the woods and back to your home."(sound effects rain and wind) | Turn left and that's the way out of the woods and back to your home."(sound effects rain and wind) | |
| [BRANCH CODE] Rebecca started to go the way the squirrel had said. | [BRANCH CODE] Rebecca started to go the way the rabbit had said. | [BRANCH CODE] Rebecca started to go the way the white rabbit had said. | [BRANCH CODE] Rebecca started to go the way the owl had said. | Branch Type Z-2 |
| She ran and ran. It was getting colder and suddenly she fell and splashed in the mud below. | She ran and ran. It was getting colder and suddenly she fell and splashed in the mud below. | She ran and ran. It was getting colder and suddenly she fell and splashed in the mud below. | She ran and ran. It was getting colder and suddenly she fell and splashed in the mud below. | |
| [BRANCH CODE] Her yellow dress was ruined but she wanted to get home so she got up and kept running. | [BRANCH CODE] Her pink dress was ruined but she wanted to get home so she got up and kept running. | [BRANCH CODE] Her polka dot dress was ruined but she wanted to get home so she got up and kept running. | [BRANCH CODE] Her white dress was ruined but she wanted to get home so she got up and kept running. | Branch Type Z-1 |
| [BRANCH CODE] Finally she got to the big oak tree near the waterfall | [BRANCH CODE] Finally she got to the big oak tree near the babbling brook. | [BRANCH CODE] Finally she got to the big oak tree near the stream. | [BRANCH CODE] Finally she got to the big oak tree near the broken fence. | Branch Type Z-3 |

-continued

| Channel 1 | Channel 2 | Channel 3 | Channel 4 | SWITCH COMMANDS |
|---|---|---|---|---|
| [BRANCH CODE] She turned left | [BRANCH CODE] She turned left | [BRANCH CODE] She turned right | [BRANCH CODE] She turned right | Branch Type X-4 |
| [BRANCH CODE] as the squirrel had said | [BRANCH CODE] as the rabbit had said | [BRANCH CODE] as the white rabbit had said | [BRANCH CODE] as the owl had said | Branch Type Z-2 |
| [BRANCH CODE] and finally came to the path that led her back home out of the woods and Rebecca lived happily ever after. (music close) | [BRANCH CODE] and finally came to the path that led her back home out of the woods and Rebecca lived happily ever after. (music close) | [BRANCH CODE] and she got more and more lost. Had she made a mistake? She walked and walked and to this day Rebecca is out there somewhere, lost in the woods. (music close) | [BRANCH CODE] and she got more and more lost. Had she made a mistake? She walked and walked and to this day Rebecca is out there somewhere, lost in the woods. (music close) | Branch Type Z-4 |
| END | END | END | END | |

Figure 2:
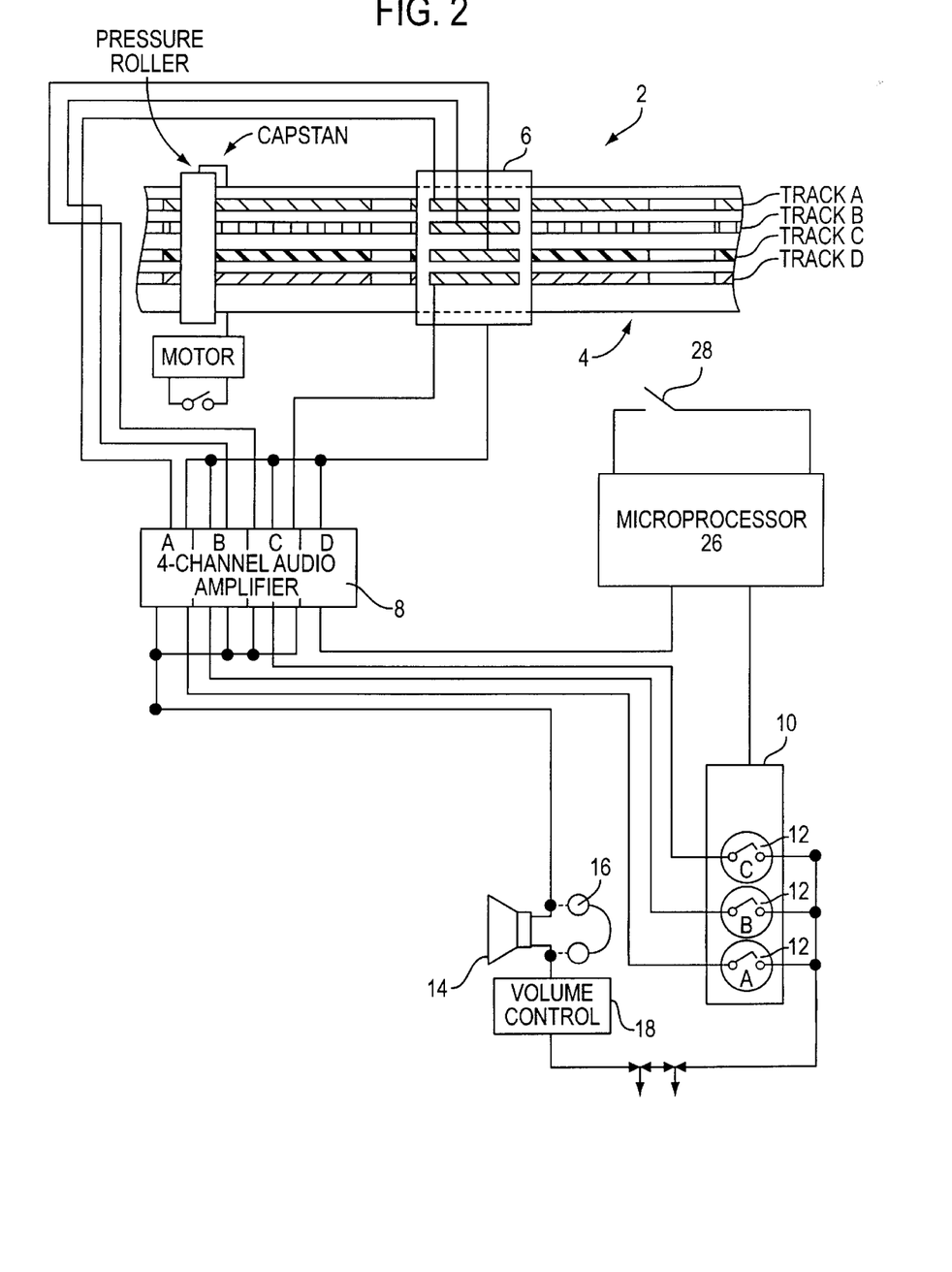
FIG. 2 is a diagrammatic illustration, partially in schematic, of the selection, playback, and controller portions of an alternative embodiment of the invention.

Example 2 demonstrates a more complex example. In this example, three tracks, i.e., tracks 1–3 are used to store the story information. The fourth track, i.e., track 4 is used to store command code information. As shown in FIG. 2, a microprocessor 26 is utilized to read track switching instructions from the audio tape itself in order to perform random or non-random switching at the desired switch points. In this embodiment, a conventional one channel amplifier preferably reads audible control commands for the microprocessor from Channel 4, while another conventional one channel amplifier plays back the selected one of the remaining channels for playing the story content. In order to perform the "Replay" function discussed below, microprocessor 26 is equipped with non-volatile RAM or other memory, which is preferably either static, i.e., it will not be lost when power to the system is turned off, or is connected to the power source so that the memory will be retained until the battery is drained. If the "Replay" function is not used, any appropriate type of memory may be employed. For this example, "SFX" denotes a special effect. Accordingly, SFX A denotes a different sound effect than SFX B. "MUSIC" denotes the background music on the track. Thus, MUSIC A is different from MUSIC B. In connection with the Replay function, at the beginning of the track with the command codes a TAPE ID code is preferably stored. The TAPE ID is unique to each story tape and is used by the microprocessor to identify the tape. "Branch Type X" denotes a command to the microprocessor to place in the indicated memory (e.g. X-1 stores the Channel No. in memory #1) the Channel No. of the channel being played at the time of the branch. Branch Type "Y" is a random branch to any of the three channels. Branch type "Z" is a branch to the Channel indicated in the associated memory (e.g., Branch Type Z-1 will branch to the Channel No. stored in memory No. 1.)

EXAMPLE 2

| CHANNEL 1 | CHANNEL 2 | CHANNEL 3 | CHANNEL 4 |
|---|---|---|---|
| MUSIC A: Once upon a time, a young boy named Joey was playing at the beach. It was hot and a very nice day. Joey went down to the ocean to get a pail of water for a very big castle he was building. Suddenly, just under the pier, Joey noticed a bottle that had washed up on to the beach. Joey picked up the bottle and rubbed all the sand off the bottle. | MUSIC B: Once upon a time, a young boy named John was playing at the beach. It was hot and a very nice day. John went down to the ocean to get a pail of water for a sand castle he was building. Suddenly, just under the pier, John noticed a bottle that had washed up on to the beach. John picked up the bottle and rubbed all the sand off the bottle. | MUSIC C: Once upon a time, a young boy named Mike was playing at the beach. It was hot and a very nice day. Mike went down to the ocean to get a pail of water for a big sand castle he was building. Suddenly, just under the pier, Mike noticed a bottle that had washed up on to the beach. Mike picked up the bottle and rubbed all the sand off the bottle. | TAPE ID Branch type X-1 |
| | | | Branch type Y |
| Suddenly red smoke came out of the bottle and surrounded Joey. (SFX A) | Suddenly blue smoke came out of the bottle and surrounded John. (SFX B) | Suddenly white smoke came out of the bottle and surrounded Mike. (SFX C). | Branch type Z-1 Branch type Y (for SFX) |
| "Thank you for setting me free" came a voice from the smoke. "Who are you asked Joey? "I am the Genie of the bottle. I've been in that | "Thank you for setting me free" came a voice from the smoke. "Who are you asked John? "I am the Genie of the bottle. I have been in | "Thank you for setting me free" came a voice from the smoke. "Who are you asked Mike? "I am the Genie of the bottle. I have been in | Branch type Z-1 Branch type Y |

-continued

| CHANNEL 1 | CHANNEL 2 | CHANNEL 3 | CHANNEL 4 |
| --- | --- | --- | --- |
| bottle for <u>1000</u> years and you set me free. And now I can grant you three wishes. Any three wishes you desire you shall have. What is your first wish?" Three wishes thought <u>Joey</u>. He could have candy, a big screen TV in his room. be a famous movie star. or even have no more school! How could he ever decide! Finally <u>Joey</u> decided what he wanted for his first wish. "I want no more school ever", yelled <u>Joey</u>. And the Genie said "Your wish is my command. I will grant your wish. | that bottle for <u>100</u> years and you set me free". And now I can grant you three wishes. Any three wishes you desire you shall have. What is your first wish"?. Three wishes thought <u>John</u>. He could have Toys, a color TV in his room, be a famous TV star, or even have no more school! How could any little boy ever decide! Finally <u>John</u> decided what he wanted for his first wish "I want hundreds of new toys" John said. And the Genie said "your wish is my command. I will grant your wish." | that bottle for <u>500</u> years and you set me free:. And now I can grant you three wishes. Any three wishes you desire you shall have. What is your first wish"?. Three wishes thought <u>Mike</u>. He could have candy, a big screen TV in his room, be a famous rock star, or even end school forever! How could such a little boy ever decide! Finally Mike decided what he wanted for his first wish "I want the biggest TV ever made" said Mike". And the Genie said "your wish is my command. I will grant your wish." | Branch type Z-1 |
| (SFX D) <u>Suddenly it was Monday morning and Joey jumped out of bed only to realize he had no school. He could sit and do nothing all day. He could read, play video games, eat, do anything he wanted to do. It was so much fun. He watched TV all day Tuesday, played video games on Wednesday, took a long walk on Thursday and watched TV again on Friday. After one more week of this, Joey was getting very bored and asked the Genie for his second wish. "What do you want" asked the Genie.</u> | (SFX E) <u>Suddenly John was home surrounded by every toy he ever imagined. He examined each toy. He loved it. He could play with each one. He had more toys than any kid on Earth. He played with Elmo, Big Bird, Nintendo. He played darts, cards, and even drove an electric car. He played every minute he could. All week. Even the next week After yet another week of playing with all these toys, John was getting bored and tired so he asked the Genie for his second wish. "What do you want" asked the Genie.</u> | (SFX F) <u>Suddenly, Mike was home in his room and right in front of him was a big- very big, TV set. It was tremendous, Mike turned it on and sat down to watch. He watched and watched. He watched every channel he could find. After that he watched every channel again. He watched every minute he could. He even watched late into the night. After yet another week of watching TV, Mike was getting bored and cross-eyed so he asked the Genie for his second wish. "What do you want asked the Genie"</u> | Branch type Y Branch type Z-1 |
| (Music D in) "I want my second wish now" said the boy. And the Genie said "your wish is my command. I will grant your second wish. What is it?"(Music D out) <u>Joey</u> said "I want candy, hot dogs, and all the soda I can drink." "Easy", said the Genie and suddenly the room was filled with chocolate. cup cakes, jelly beans, M&Ms, ice cream, bubble gum, hot dogs, coca cola, orange soda, and even ice cream sodas and banana splits. Joey was so happy. He never saw so much delicious food in his life! <u>He ate a hot dog, washed it down with coca cola, had the banana split for dessert, and had a cup cakes just for fun.</u> He was having | (Music E in) "I want my second wish now" said the boy. And the Genie said "your wish is my command. I will grant your second wish. What is it?" (Music E out) <u>John</u> said" I want candy, hot dogs, and all the soda I can drink.' "Easy", said the Genie and suddenly the room was filled with chocolate. cup cakes, jelly beans, M&Ms, ice cream, bubble gum, hot dogs, coca cola, orange soda, and even ice cream sodas and banana splits. John was so happy. He never saw so much delicious food in his life! <u>He ate hamburgers, washed it down with soda, had the banana split for dessert, and had two cup cakes just for fun.</u> He was | (Music F in) "I want my second wish now" said the boy. And the Genie said "your wish is my command. I will grant your second wish. What is it?" (Music F out) <u>Mike</u> said" I want candy, hot dogs, and all the soda I can drink." "Easy", said the Genie and suddenly the room was filled with chocolate. cup cakes, jelly beans, M&Ms, ice cream, bubble gum, hot dogs, coca cola, orange soda, and even ice cream sodas and banana splits. Mike was so happy. He never saw so much delicious food in his life! <u>He ate a hot dog, washed it down with Seven-up had an ice cream sundae for dessert and had three cup cakes just for fun.</u> | Branch type Y Branch type Z-1 Branch type Y |

-continued

| CHANNEL 1 | CHANNEL 2 | CHANNEL 3 | CHANNEL 4 |
| --- | --- | --- | --- |
| the best day in his life. | having the best day in his life. | He was having the best day in his life. | |
| After about an hour, Joey began to get a stomach ache. It was a bad one. He had cramps and everything. He realized he had eaten much too much. He called for the Genie again. | After about an hour, John began to get a stomach ache. It was a bad one. He had cramps and everything. He realized he had eaten much too much. He called for the Genie again. | After about an hour, Mike began to get a stomach ache. It was a bad one. He had cramps and everything. He realized he had eaten much too much. He called for the Genie again. | Branch type Z-1 |
| (Music H in) The Genie appeared and said. "Your wish is my command. Are you ready for your third wish? (Music H OUT) | (Music I in) The Genie appeared and said. "Your wish is my command. Are you ready for your third wish? (Music I OUT) | (Music J in) The Genie appeared and said, "Your wish is my command. Are you ready for your third wish? (Music J OUT) | Branch type Y |
| Joey thought and thought. And finally said, "yes I am. I am ready for my third wish." "Well what is it" said the Genie. "I am here and I will grant you your final wish." | John thought and thought. And finally said, "yes I am. I am ready for my third wish." "Well what is it" said the Genie: "I am here and I will grant you your final wish." | Mike thought and thought. And finally said, "yes I am. I am ready for my third wish." "Well what is it" said the Genie. "I am here and I will grant you your final wish." | Branch type Z-1 |
| Joey said, "for my final wish just make everything the way it was before I even met you. I'm lonely. I have a stomach ache and I kind of miss my friends and teachers at school. I appreciate everything you've done but I guess I was better off before. So please return my life to the way it was before I met you. | John said, "for my final wish, just make everything the way it was before I even met you. I'm lonely. I have a stomach ache and I kind Miss my friends a lot, Toys are great and everything but too much is no good. So please return my life to the way it was before I met you. | Mike said "for my final wish I want money, lots and lots of money" "Your wish is my command" said the Genie<br><br>And suddenly Mike was surrounded by piles and piles of money. Mike sat there and started to count all his money. He thought about his three wishes and how happy he thought he'd be but for now he was just sitting there counting money. | |
| "So it shall be done" said the Genie and in a puff of smoke and a bolt of lightening. Joey was back at the beach and the magic lamp was gone forever. | "So it shall be done" said the Genie and in a thunderous clap of his hands, John was back at the beach and the magic lamp was gone forever. | Suddenly the phone rang. It was his friend Shawn asking to come over so they could play.<br><br>Mike thought about it and decided to stay home and count his money. After all it would take years. He hung up and went back to counting, counting, and more counting. | |
| (MUSIC D CLOSE) | (MUSIC E CLOSE) | (MUSIC F CLOSE) | Branch type Y |

As shown in FIG. 2, the apparatus preferably includes a switch 28 connected to the microprocessor. The apparatus is preferably located within a cuddly teddy bear or other housing suitable for children. Accordingly, the switch would be located on the surface of the teddy bear, on the bear's ears, etc. Switch 28 is preferably a momentary switch that is labeled "Freeze", "Replay", or the like. During playback of a story, the microprocessor records the STORY ID of the story and preferably stores in non-volatile memory all of the branching that occurs during playback of the story. After listening to the story, the user may press this switch, at which time the branching for the STORY ID will be locked into memory. During the next playback of the story, the microprocessor will use the stored branching in playing back the particular story. This may include random branches, if desired, which may be stored in memory at the time the branch is made. If the switch is depressed after the next playback of the story using the stored branching, the branching will again be stored in memory and used during the next playback. If desired, a TAPE ID may be associated with an entire group of stories and the same switch or a different switch used to store branching for an entire tape or group of stories. It will be appreciated that the memory functions may be varied as desired to implement any desired functionality provided that sufficient memory is available.

Although the present invention has been described in detail with respect to certain embodiments and examples, variations and modifications exist that are within the scope of the present invention as defined in the following claims.

What is claimed is:

1. A story-telling apparatus which comprises:

a storage media which comprises a plurality of temporally parallel data storage tracks containing story content, the story being stored on the temporally parallel data storage tracks in a plurality of temporally related information segments, each of the segments comprising a complete message reproducible in response to the selection of the track upon which the segments are stored, each of the information segments at any given time on a temporally parallel data storage track comprising information related in real-time and content to information contained in each information segment on each temporally parallel data storage track in an immediate prior time, the information stored on the temporally parallel data storage tracks in a predetermined timed sequence for providing story content varying dependent upon the temporally parallel data storage tracks selected during playback, the storage media further comprising random switching command codes for providing switching instructions to randomly switch between the temporally parallel data storage in order to provide random variation of the story content during playback thereof;

playback means for playing back the story content of a selected data storage track and for retrieving the random switching command codes from the storage media;

a code discriminator for identifying the random switching command codes retrieved from the storage media by the playback means;

a controller for receiving the random switching command codes from the code discriminator and for causing the playback means to select and playback a random one of the temporally parallel data storage tracks of the storage media in response to receiving a random switching command code, the playback means retrieving the information stored on the randomly selected temporally parallel data storage track to randomly vary the playback of the story content.

2. The apparatus according to claim 1 wherein one of the temporally parallel data storage tracks comprises the random switching command codes, the playback means further comprising random switching command code playback means for providing playback of the temporally parallel data storage track comprising the random switching command codes independently of the temporally parallel data storage tracks comprising the story content.

3. The apparatus according to 1 wherein the temporally parallel data storage tracks are stored on a magnetic storage media having a plurality of coextensive tracks wherein the playback means comprises magnetic storage media reading means corresponding with each of the plurality of coextensive tracks.

4. The apparatus according to claim 2 wherein the temporally parallel data storage tracks are stored on a magnetic storage media having a plurality of coextensive tracks wherein the playback means comprises magnetic storage media reading means for the random command code track, and at least one magnetic media storage media readings means for the coextensive temporally parallel data storage tracks comprising the story content.

5. The apparatus according to claim 1 wherein the temporally parallel data storage tracks are stored digitally and are randomly accessible.

6. The apparatus according to claim 5 wherein the storage media is selected from the group consisting of magnetic disk, compact disk, video disk, magnetic tape, RAM, PROM, EPROM, and EEPROM.

7. The apparatus according to claim 1 wherein the data storage media are analog cassette tapes and wherein the playback means enables the removal and replacement of the storage media.

8. The apparatus according to claim 1 wherein the random switching command codes further comprise memory storage commands and memory switching commands, the apparatus further comprising means for storing a first identification of a current temporally parallel data storage track being played back in response to a memory storage command, and means for switching to the temporally parallel data storage track associated with the first identification in response to a memory switching command.

9. The apparatus according to claim 1 wherein the temporally parallel data storage tracks comprising story content comprise audible or inaudible random switching command codes.

10. The apparatus according to claim 9 further comprising means for discriminating the audible or inaudible random switching command codes from the story content.

11. The apparatus according to claim 1 wherein the random switching command codes further comprise memory storage commands and memory switching commands, the apparatus further comprising means for storing at least a first identification of a current temporally parallel data storage track being played back in response to a memory storage command, and means for switching to the temporally parallel data storage track associated with the at least first identification in response to a memory switching command.

12. The apparatus according to claim 1 further comprising memory means for storing the branching of playback of a particular story, and means for playing back the story using the stored branching.

13. The apparatus according to claim 12 further comprising a playback switch for initiating the means for playing back the story.

14. The apparatus according to claim 13 further comprising a store switch for initiating storing the branching.

15. The apparatus according to claim 14 further comprising means for identifying each particular storage media, and means for playing back stored branching of a prior playback of the particular storage media.

* * * * *